United States Patent [19]

Hicks

[11] 4,190,791
[45] Feb. 26, 1980

[54] SWITCHING REGULATOR FOR TELEVISION DEFLECTION CIRCUIT WITH IMPROVED ULTOR VOLTAGE REGULATION

[75] Inventor: James E. Hicks, New Palestine, Ind.
[73] Assignee: RCA Corporation, New York, N.Y.
[21] Appl. No.: 957,221
[22] Filed: Nov. 2, 1978
[51] Int. Cl.² .......................................... H01J 29/70
[52] U.S. Cl. ..................................... 315/408; 315/411
[58] Field of Search ................................ 315/408, 411

[56] References Cited

U.S. PATENT DOCUMENTS

| | | | |
|---|---|---|---|
| 3,235,766 | 2/1966 | Martin et al. | 315/408 |
| 3,970,780 | 7/1976 | Minoura | 315/411 X |
| 4,081,722 | 3/1978 | Haferl | 315/408 X |
| 4,099,101 | 7/1978 | Teuling | 315/408 |
| 4,147,964 | 4/1979 | Luz et al. | 315/411 |

Primary Examiner—Malcolm F. Hubler
Attorney, Agent, or Firm—Eugene M. Whitacre; Paul J. Rasmussen; William H. Meise

[57] ABSTRACT

A horizontal deflection circuit drives a deflection winding and an ultor voltage generator. The energizing voltage for the horizontal deflection generator is regulated by a switching regulator including an SCR, a filter inductor, a filter capacitor and an SCR turn-off winding. The turn-off winding couples a retrace pulse to the SCR during each horizontal retrace interval to turn the SCR off in preparation for the following regulation interval. A second winding is magnetically coupled to the deflection circuit and through a diode to the filter inductor for providing a path by which current can continue to flow in the filter inductor during SCR nonconduction and which effectively couples the filter inductance across the deflection winding. Variations in kinescope beam current cause corresponding variations in the current through the filter inductor at the end of the trace interval. The current variations in the filter inductor cause the diode to become nonconductive at times during the retrace interval which are related to the beam current, thereby changing the average time during which the filter inductor parallels the deflection winding and varying the retrace pulse duration in such a manner as to improve the ultor voltage generator regulation.

9 Claims, 4 Drawing Figures

SWITCHING REGULATOR FOR TELEVISION DEFLECTION CIRCUIT WITH IMPROVED ULTOR VOLTAGE REGULATION

BACKGROUND OF THE INVENTION

This invention relates to a switching regulator which is coupled to a horizontal deflection circuit in a manner which provides the deflection circuit with regulated supply voltage and additionally improves the regulation of an ultor voltage produced from the retrace pulses.

Increasing emphasis on reduced power consumption has led to the increased use of switching regulators for powering television receivers. In switching regulators, a switch coupled to the raw or unregulated direct voltage supply is periodically turned on and off with a duty cycle adapted to regulate the controlled voltage. A major load on such regulators in a television receiver is the horizontal deflection circuit and the associated kinescope ultor voltage generator. Switching regulators are normally configured in a feedback arrangement by which variations in the voltage or current at a particular point in the circuit can be reduced, i.e., regulated. If the voltage applied as supply to the horizontal deflection circuit is regulated, the voltage across the deflection switching transistor will be controlled, but the regulation of the ultor supply is then completely dependent upon the effective impedances of the high-voltage transformer, rectifiers and associated filter capacitors. On the other hand, if a voltage representative of the ultor voltage is regulated, the impedance of the ultor generator is reduced by the loop gain of the feedback regulator, but the supply voltage applied to the horizontal deflection circuit and the resulting retrace voltage pulse amplitude across the deflection switch are variable. Consequently, the horizontal deflection switch must have a higher voltage rating.

U.S. patent application Ser. No. 875,530 filed Feb. 6, 1978 in the name of Peer et al. describes a switching regulator in which an SCR is used as the control element for controllably charging a capacitor from the unregulated supply through the series connection of an inductor and a winding coupled to the horizontal deflection circuit. In the Peer et al. arrangement, the inductor must be small enough so that the current in the inductor and SCR can be reduced to zero during the retrace interval by the difference between the unregulated direct voltage and the sum of the turn-off voltage pulse generated across the winding and the regulated voltage. As a result, relatively large peak currents may flow in the inductor and in the storage capacitor during the capacitor charging interval. These relatively large currents undesirably result in relatively large $I^2R$ or heating losses. The SCR turn-off requirements and the relatively large variations in regulator current with changes in load current such as those resulting from kinescope beam current changes vary the regulator peak current. Due to the coupling between the turn-off winding and the horizontal deflection circuit, the varying regulator current tends to reduce the retrace time with increases in beam current, thereby increasing the peak retrace voltage in a manner tending to compensate for the reduction in ultor voltage due to kinescope beam current loading.

A flywheel diode when used with the arrangement of Peer et al. allows the SCR to be turned off by the turn-off winding independent of the filter inductor, whereby the filter inductor may be increased in size to reduce the peak filter capacitor charging currents and therefore reduce heating losses, while guaranteeing SCR turn-off during the retrace interval. With such an arrangement, however, the advantageous compensation of the retrace pulse amplitude in the presence of kinescope beam loading is not available.

SUMMARY OF THE INVENTION

A regulated drive arrangement for a television display apparatus includes a controllable switch, a filter inductor, a first winding and a deflection switch coupled across a source of unregulated direct voltage for providing a path for the flow of increasing current through the inductor during those intervals in which the controllable switch is closed. A rectifier is coupled to a terminal of the source and with the inductor for providing a path for the flow of a decreasing current through the inductor during those intervals in which the controllable switch is open. A capacitor is coupled to the inductor and to a terminal of the source for integrating the increasing and decreasing currents through the inductor in order to form an operating voltage. A control circuit is coupled to the switch and to a source of voltage representative of the operating voltage for controlling the switch in such a manner as to stabilize the operating voltage. A deflection winding and retrace capacitance are coupled across the deflection switch for providing a path for the flow of deflection current during recurrent trace and retrace intervals. The duration of the retrace intervals is dependent upon the inductance in parallel with the capacitance. An ultor voltage generator is coupled to the first winding for generating an ultor voltage. The ultor voltage varies in response to variations in the current drawn from the ultor supply and also in response to variations in the duration of the retrace interval. A second winding is serially coupled with the inductor for providing a path for the flow of the increasing and decreasing currents. The second winding is magnetically coupled to the first winding for coupling the inductor in parallel with the deflection winding in such a manner as to alter the inductance in parallel with the capacitance and thereby alter the duration of the retrace interval in a manner which compensates for current-dependent variations in the ultor voltage.

DESCRIPTION OF THE INVENTION

Figure 1:
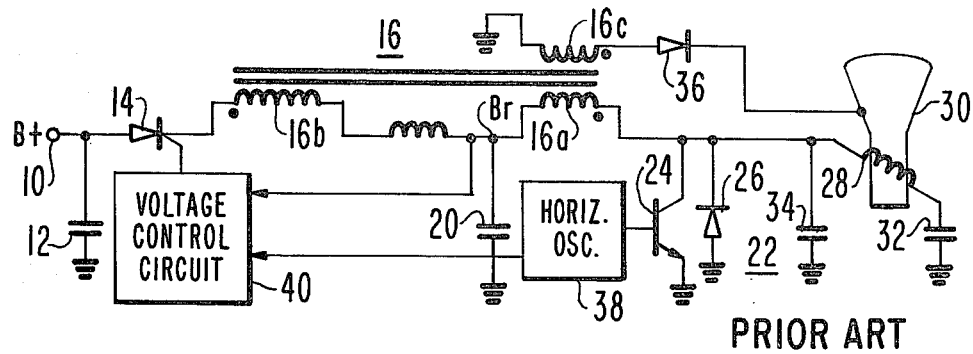
FIG. 1 illustrates partially in block and partially in schematic diagram form the regulating, deflection and high-voltage portions of a television apparatus according to the prior art.

FIG. 1 illustrates a portion of a television display arrangement according to the aforemention Peer et al. application. In FIG. 1, an unregulated B+ terminal 10 is connected to a source of pulsating direct current such as a rectifier coupled to the AC power line. A filter capacitor 12 is connected between terminal 10 and ground for filtering the pulsating direct current and generating the raw energizing voltage for the remainder of the apparatus. A controllable switch in the form of an SCR 14 has its anode connected to terminal 10 and its cathode connected to one end of a winding 16b of a transformer 16. The other end of winding 16b is connected to one end of a filter inductor 18. The other end of filter inductor 18 is coupled to ground by a filter capacitor 20. The junction Br of inductor 18 and capacitor 20 is connected to one end of a winding 16a of transformer 16. Winding 16a acts as the input inductor for a horizontal deflection circuit designated generally as 22. Deflection circuit 22 includes an NPN transistor 24 having its emitter coupled to ground and its collector connected to the end of winding 16a remote from junction Br. A damper diode 26 is coupled across the collector-emitter conducting path of transistor 24. A deflection winding 28 associated with a kinescope 30 is coupled in series with an S-shaping capacitor 32, and the series combination is coupled in parallel with diode 26. A retrace capacitor 34 is connected in parallel with diode 26 to supplement the capacitance of winding 28 to aid in establishing the proper duration of the retrace interval. A winding 16c of transformer 16 has one end connected to ground and the other end coupled by way of a rectifier illustrated as a diode 36 to the ultor of kinescope 30 for peak-rectifying the retrace pulses to generate the direct ultor voltage for the kinescope. A horizontal oscillator illustrated as a block 38 produces drive signals at the horizontal deflection frequency which are applied to the base of transistor 24. Horizontal oscillator 38 also produces synchronizing pulses at the horizontal rate which are coupled to a voltage control circuit illustrated as a block 40. Control circuit 40 is coupled to junction Br and is also coupled to the gate of SCR 14 for controlling the SCR in known manner to maintain the voltage at junction Br at a constant value.

Figure 2:
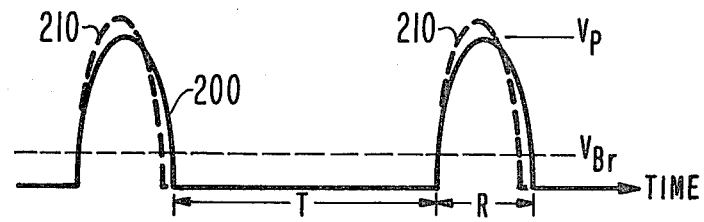
FIG. 2 illustrates as a voltage-time graph of retrace pulses occurring in the arrangement of FIG. 1 during operation.

In normal operation, voltage control circuit 40 triggers SCR 14 into conduction at a time during the horizontal trace interval. During the interval in which SCR 14 is conductive, current in inductor 18 increases at a rate determined by the voltage across winding 16b plus the difference between the regulated voltage VBr at junction Br and the raw B+ across capacitor 12. At the end of the horizontal trace interval T, a retrace voltage pulse illustrated as 200 in FIG. 2 is generated across capacitor 34. The voltage pulse is coupled from winding 16a to winding 16b. The voltage pulse across winding 16b is poled in such a manner as to tend to reverse-bias SCR 14 and to reduce the current flowing in inductor 18. Inductor 18 is of such a size that the current in the inductor is normally reduced to zero within the retrace interval by the difference between the unregulated B+ and the sum of VBr and the voltage across winding 16b. When the current in winding 18 reaches zero, SCR 14 becomes nonconductive in preparation for the next cycle of regulating action. Regulation of voltage VBr is accomplished in the arrangement of FIG. 1 by duty cycle modulation of conduction of SCR 14, which is accomplished by changing the time during the horizontal deflection interval at which SCR 14 is gated into conduction. As is known, variations in the beam current of kinescope 30 which may result from changes in the picture content cause the ultor current to change. Since the ultor current is drawn through winding 16c and rectifier 36, increased current drain in kinescope 30 results in a lowering of the effective impedance of winding 16a. Consequently, more current is drawn from capacitor 20 by deflection circuit 22 during those intervals in which the beam current is increased. Control circuit 40 during periods of increased beam current gates SCR 14 earlier in order to increase the total current flow in inductor 18 to compensate for the increased current drain from capacitor 20. Thus, the current in inductor 18 varies with the kinescope beam current.

During the intervals in which SCR 14 is conductive, inductor 18 is effectively coupled across winding 16b by the series combination of capacitor 20 and the low impedance of the unregulated B+ source represented by capacitor 12. Since the impedance across winding 16b appears across winding 16a, the inductance of inductor 18 may be viewed as appearing across winding 16a during intervals in which SCR 14 is conductive. Because the relatively low impedance of capacitors 20 and 32, the inductance of inductor 18 is also effectively in parallel with deflection winding 28. Thus, during the intervals in which SCR is conductive, the effective inductance of deflection winding 28 and winding 16a is reduced by the parallel inductance of inductor 18.

As mentioned, the retrace duration is established by the inductance of windings 16a and 28 and by the capacitance of the windings together with the capacitance of capacitor 34. Also as mentioned, SCR 14 is conductive during the retrace interval until the current of inductor 18 is reduced to zero by the turn-off pulse across winding 16b. Consequently, during a first portion of the retrace interval, inductor 18 is effectively coupled in parallel with winding 28, and during a second portion of the retrace interval SCR 14 is nonconductive and the inductance of inductor 18 does not affect the retrace timing. The retrace duration is therefore dependent upon the length of time SCR 14 remains conductive after the beginning of the retrace interval, which in turn is dependent upon the amount of current flowing in inductor 18 at the beginning of the retrace interval. When the kinescope beam current is large, the current in inductor 18 increases and SCR 14 remains conductive for a longer time after the beginning of the retrace interval. This couples inductor 18 in parallel with winding 28 for a longer portion of the retrace, thereby reducing the retrace pulse duration compared with the duration at low beam currents.

Retrace pulse 200 as illustrated in FIG. 2 is represented as having an amplitude VP and a duration of R at low beam current. With increased beam current, the peak value of the retrace pulse would be expected to diminish due to the internal impedance of the ultor source. However, increased beam current reduces the retrace time as illustrated by dashed waveform 210 of FIG. 2. Because the average value of pulses 200 and 210 must remain at VBr, the reduction in retrace pulse duration results in an increase in the peak value of the waveform as represented by pulse 210. This increase in the peak voltage of the retrace pulse tends to compensate for the beam loading of the ultor generator and provides improved regulation.

Figure 3:
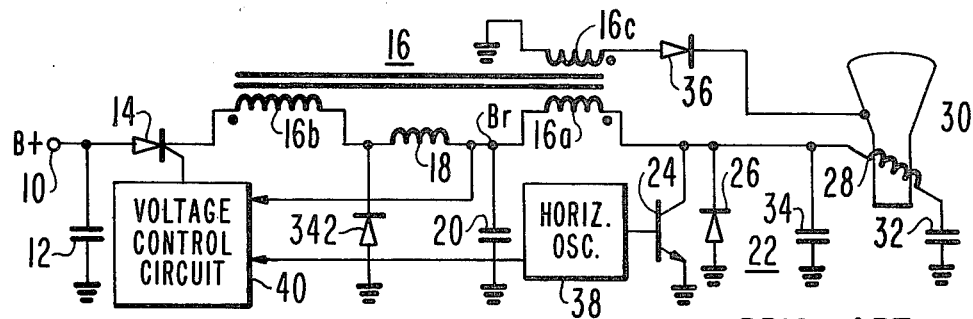
FIG. 3 illustrates an apparatus similar to that of FIG. 1 including a diode for decoupling the regulator switch from the filter inductor during the retrace interval.

FIG. 3 illustrates the regulating, deflection and ultor generating portions of a television receiver similar to that of FIG. 1. In FIG. 3, those elements corresponding to those of FIG. 1 are designated by the same reference number. FIG. 3 differs from FIG. 1 by the inclusion of a diode 342 connected between ground and the junction of winding 16b and inductor 18. This arrangement decouples inductor 18 from SCR 14 during the retrace interval by providing a second path through which current can flow through inductor 18 and capacitor 20. With SCR 14 decoupled from inductor 18, the SCR is turned off reliably regardless of the dimensioning of inductor 18.

However, in the arrangement of FIG. 3, inductor 18 is decoupled from winding 16b during the entire retrace interval. Thus, the advantageous compensation of retrace pulse amplitude as a function of kinescope beam current cannot occur.

Figure 4:
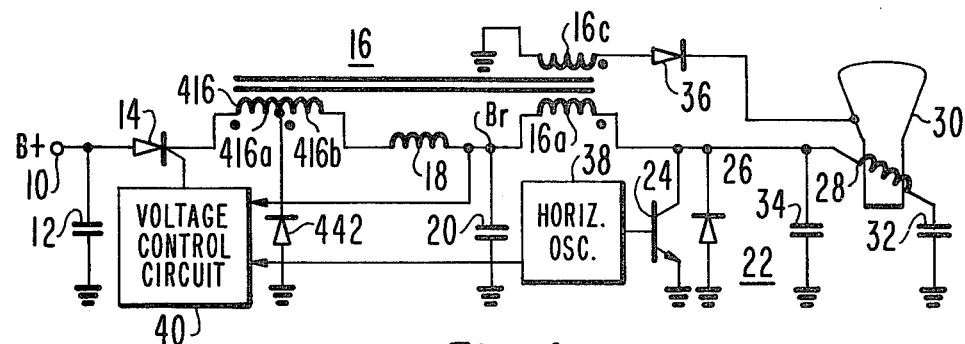
FIG. 4 illustrates in block and schematic diagram form the regulating, deflection and high-voltage portions of a television apparatus embodying the invention.

In FIG. 4, elements corresponding to those of FIGS. 1 and 2 are designated by the same reference numbers. FIG. 4 includes a tapped winding 416 of transformer 16. The tap divides winding 416 into two portions 416a and 416b. A diode 442 is connected between ground and the tap on winding 416. In operation of the arrangement of FIG. 4, voltage control circuit 40 gates SCR 14 into conduction at a time during the horizontal trace interval which is controlled to maintain the regulated voltage VBr across capacitor 20 and deflection circuit 22 at a substantially constant value. Gating-time control of SCR 14 causes the voltage across inductor 18 to be applied for varying intervals and results in differing currents at the beginning of the retrace interval, as described above. Changes in kinescope beam current cause corresponding increases in the loading on capacitor 20 and in the current flowing through inductor 18 at the beginning of the retrace interval. During the retrace interval, the retrace pulse appearing across capacitor 34 is coupled by winding 16a to winding 416. That portion of the pulse appearing across winding 416a will render SCR 14 nonconductive when the pulse magnitude equals the unregulated direct voltage. Thus, the arrangement of FIG. 4 provides reliable turn-off of the SCR regardless of the magnitude of inductor 18.

During the retrace interval diode 442 is conductive and the current in inductor 18 is reduced towards zero by the sum of the retrace-interval pulse appearing across winding 416b and regulated voltage VBr. At the same time, inductor 18 is coupled across winding 416b by diode 442 and capacitor 20, and the inductance of inductor 20 is effectively in parallel with flyback winding 16a and deflection winding 28 as in the case of FIG. 1. The length of time that current flows in inductor 18 and diode 442 remains conductive during the retrace interval depends upon the magnitude of the current flowing through inductor 18 at the beginning of the retrace interval. Consequently, increased kinescope beam current which causes an increased current in inductor 18 at the end of the retrace interval cause diode 442 to remain conductive during a greater portion of the retrace interval. This maintains inductor 18 effectively in parallel with windings 16a and 28 for a greater portion of the retrace interval, reducing the average inductance in parallel with capacitor 34 and thereby reduces the retrace interval. As mentioned, reduced retrace interval increases the peak retrace voltage. Thus, the arrangement of FIG. 4 provides an increased peak retrace voltage in response to increased beam current and thus provides the advantageous regulation compensation of FIG. 1 together with the reliable SCR turn-off of the arrangement of FIG. 3.

Other embodiments of the invention will be apparent to those skilled in the art. In particular, capacitor 20 may be connected to terminal 10 rather than to ground in order to filter the regulating voltage. Windings 416a and 416b may be independent windings rather than a single tapped winding of transformer 16. The capacitance of windings 16a and 28 may be controlled to eliminate the requirement for retrace capacitor 34. Also, the timing signal for the voltage control circuit may be derived from other points, such as transformer 16, rather than from the horizontal oscillator.

What is claimed is:

1. A regulator drive arrangement for a television display apparatus, comprising:

a controllable switch, a filter inductor, a first winding and a deflection switch coupled across a source of unregulated direct voltage for providing a path for the flow of an increasing current through said inductor during those intervals in which said controllable switch is closed;

a rectifier coupled to a terminal of said source and with said inductor for providing a path for the flow of a decreasing current through said inductor during those intervals in which said controllable switch is open;

a capacitor coupled with said inductor and to a terminal of said source for integrating said increasing and decreasing current through said inductor to form an operating voltage across said first winding and said deflection switch;

a control circuit coupled to said controllable switch and to a source of voltage representative of said operating voltage for controlling said controllable switch and stabilizing said operating voltage;

a deflection winding and retrace capacitance means coupled across said deflection switch for providing a path for the flow of deflection current during recurrent trace and retrace intervals, said retrace intervals being dependent upon the inductance in parallel with said retrace capacitance means;

an ultor generator coupled to said first winding for generating an ultor voltage, variations in said ultor voltage resulting from variations in the ultor current and from variations in the duration of said retrace interval; and a second winding serially coupled with said inductor for providing a path for the flow of said increasing and decreasing currents, said second winding being coupled with said first winding for coupling said inductor in parallel with said deflection winding for altering the inductance in parallel with said retrace capacitance means and for altering said duration of said retrace interval in a manner tending to compensate for said variation in said ultor voltage resulting from variations in the ultor current.

2. An arrangement according to claim 1 wherein said controllable switch comprises a control electrode and a main current conduction path which when forward biased remains nonconductive until a signal is applied to said control electrode and which thereafter remains conductive for so long as said forward bias is maintained.

3. An arrangement according to claim 2 wherein said controllable switch means comprises an SCR.

4. An arrangement according to claim 1 wherein said deflection switch comprises a transistor.

5. An arrangement according to claim 1 wherein said retrace capacitance means comprises interwinding capacitance of said deflection winding.

6. An arrangement according to claim 5 wherein said retrace capacitance means further comprises a retrace capacitor.

7. An arrangement according to claim 1 wherein said ultor generator is magnetically coupled to said first winding.

8. An arrangement according to claim 1 wherein said second winding is magnetically coupled with said first winding.

9. A television deflection apparatus adapted to be energized from a source of unregulated direct voltage, comprising:

controllable switch means including a control electrode and a main current conduction path which when forward biased remains nonconductive until a signal is applied to said control electrode and which thereafter remains conductive for so long as said forward bias is maintained;

a filter inductor and a first winding coupled to form a first series circuit, said first series circuit being coupled with said main current path to form a second series circuit, said second series circuit being coupled to a first terminal of the source of unregulated direct voltage for providing current flow in said inductor during those intervals in which said controllable switch is conductive;

a filter capacitor coupled to a second terminal of said second series circuit remote from said first terminal and to a terminal of said source for filtering said current in said inductor to form an operating voltage;

a deflection switch and a second winding coupled to form a third series circuit, said third series circuit being coupled between said second terminal of said second series circuit and a second terminal of said source for being energized by said operating voltage, said deflection switch being operated at the deflection rate for producing recurrent retrace voltage pulses;

a deflection winding and a retrace capacitance coupled in parallel with said deflection switch for producing deflection current flow in response to said retrace pulses, the duration of said retrace pulses being controlled by the inductance in parallel with said retrace capacitance;

control means coupled to said control electrode and to a source of voltage representative of said operating voltage for controlling the initiation of conduction of said main current path for maintaining said operating voltage substantially constant and thereby establishing the peak magnitude of said retrace pulses;

dependent voltage generator means coupled to said second winding and responsive to the peak magnitude of said retrace pulses for generating a dependent operating voltage;

an independent load coupled to said dependent voltage generator for loading said generator in an independently varying manner tending to cause variations in said dependent operating voltage and in said current in said inductor;

means coupling said first and second windings together for coupling said filter inductor across said deflection winding during said intervals in which said main current path is conductive thereby reducing said inductance in parallel with said retrace capacitance and for biasing said main current path for nonconduction during said retrace intervals; and unidirectional current conduction means coupled between said second terminal of said source and a tap on said first winding for providing a second path for the flow of current in said inductor during those intervals in which said controllable switch is nonconductive and for maintaining said coupling of said filter inductor across said deflection winding during said intervals in which said main current path is nonconductive for compensating said variations in said dependent operating voltage.

* * * * *